United States Patent [19]

Yamano et al.

[11] Patent Number: 4,743,122
[45] Date of Patent: May 10, 1988

[54] INFRARED-RAY TEMPERATURE MEASURING APPARATUS

[75] Inventors: Masaru Yamano, Hirakata; Yukinori Kuwano, Katano; Toshiaki Yokoo, Osaka; Kenichi Shibata; Kousuke Takeuchi, both of Hirakata; Toshiharu Tanaka, Higashiosaka, all of Japan

[73] Assignee: Sanyo Electric Co., Ltd., Japan

[21] Appl. No.: 811,806

[22] Filed: Dec. 20, 1985

[30] Foreign Application Priority Data

Dec. 24, 1984 [JP] Japan .................. 59-201800[U]
Oct. 7, 1985 [JP] Japan .................. 60-223290

[51] Int. Cl.⁴ ............................................. G01K 1/14
[52] U.S. Cl. .................... 374/208; 374/128; 374/130; 374/121
[58] Field of Search ............ 374/120, 121, 128, 130, 374/132, 208, 210; 356/43, 44

[56] References Cited

U.S. PATENT DOCUMENTS

| 1,089,743 | 3/1914 | Brown | 374/130 |
| 1,734,837 | 11/1929 | Thwing | 374/130 |
| 2,438,830 | 3/1948 | Snadecki | 356/44 |
| 2,562,538 | 7/1951 | Dyer | 374/132 |
| 2,866,064 | 12/1958 | Kenkel | 374/130 |
| 3,222,522 | 12/1965 | Birkebak | 374/130 |
| 3,626,757 | 12/1971 | Benzinger | 374/130 |
| 3,718,399 | 2/1973 | Kalman | 356/446 |
| 3,777,568 | 12/1973 | Risgin et al. | 374/128 |
| 3,942,891 | 3/1976 | Spielberger et al. | 356/43 |
| 4,548,505 | 10/1985 | Ono | 356/445 |

FOREIGN PATENT DOCUMENTS 0412495 1/1974 U.S.S.R. ................. 374/121

Primary Examiner—William A. Cuchlinski, Jr.
Attorney, Agent, or Firm—Beveridge, DeGrandi & Weilacher

[57] ABSTRACT

In an apparatus wherein an infrared sensor is incorporated opposite to an opening formed at a predetermined position of a housing, a distance keeping member for keeping a constant distance from a temperature measuring portion is further mounted on another predetermined position of the housing, and an output signal from the infrared sensor responding to the infrared rays from the temperature measuring portion is supplied to a temperature measuring circuit whose operational state is selected by a temperature measurement control switch, and the temperature of the temperature measuring portion is displayed on a display unit which is driven by the output signal from the temperature measuring circuit.

16 Claims, 11 Drawing Sheets

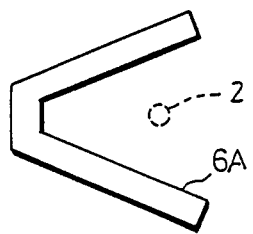 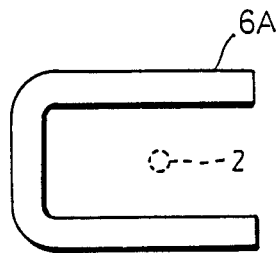 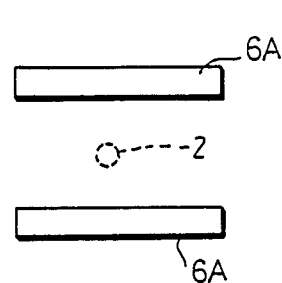
FIG.11(A)  FIG.11(B)  FIG.11(C)
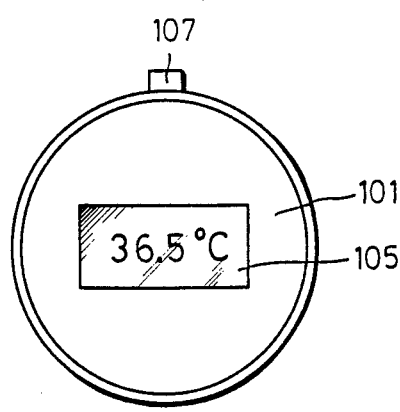
FIG.12
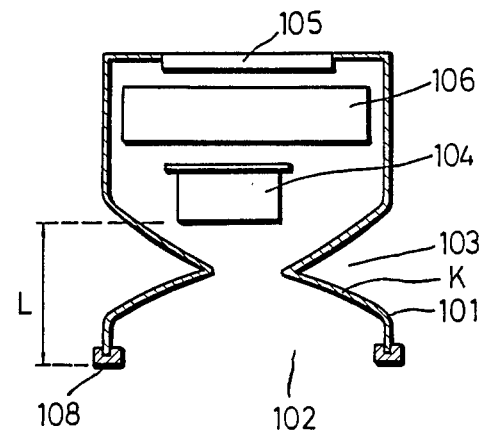
FIG.13
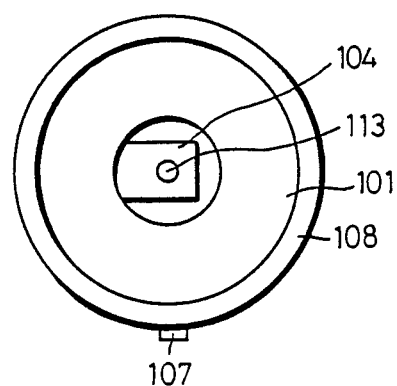
FIG.14

INFRARED-RAY TEMPERATURE MEASURING APPARATUS

BACKGROUND OF THE INVENTION

Applicable Field in Industries

The present invention relates to an infrared-ray temperature measuring apparatus wherein the surface temperature is displayed in response to the quantity of radiated infrared rays by receiving the infrared rays radiated from a portion whose temperature is to be measured.

As for the conventional infrared-ray temperature measuring apparatus of this kind, the apparatus described in the Japanese Utility Model Application No. 21205/1984 can be cited. Such an infrared-ray temperature measuring apparatus has a configuration wherein an infrared sensor which receives the infrared rays from the temperature measuring portion and outputs a signal responding to the temperature of the portion whose temperature is to be measured, a display part which displays the temperature of the temperature measuring portion by an output of that infrared sensor and a position determining means for determining the position at which the above-mentioned infrared sensor is to be disposed with a distance kept from the temperature measuring portion are provided, the position determining means is constituted with a first and a second light sources whose visible rays cross each other, and the position at which the above-mentioned infrared sensor is to be disposed is determined so that the cross point is positioned on the temperature measuring portion, and thereby the infrared sensor can be disposed simply at the position where the temperature of the temperature measuring portion can be measured accurately in a non-contact state.

However, the conventional infrared-ray temperature measuring apparatus has a configuration that the temperature measuring portion and the infrared sensor are disposed with a predetermined distance kept apart from each other by employing an optical system composed of a light source such as the light emitting diode or the like, therefore having a problem that the apparatus become large-sized as a whole.

Also, as the infrared-ray temperature measuring apparatus, an apparatus is publicly known by the specification of the U.S. Pat. No. 3,777,568, which provides a housing composed of a non-transparent material, having an opening formed at one end thereof, an infrared sensor which is disposed in the above-mentioned housing opposite to the above-mentioned opening, and a distance keeping member which is installed to keep the above-mentioned infrared sensor a predetermined distance apart from the temperature measuring portion.

The infrared-ray temperature measuring apparatus described in this literature has such problems that it is not suitable for measuring the body temperature because the tip of the distance keeping member is formed in a sharp shape, and also when measuring the temperature with this infrared-ray temperature measuring apparatus brought in contact with the temperature measuring portion, the angle made by the center of the sight of the infrared sensor and the temperature measuring portion is not constant and thereby the output from the infrared sensor differs every time the temperature is measured. Also, this apparatus has an additional problem that since the distance keeping member is located in the sight of the infrared sensor, the temperature of the distance keeping member is to be detected, and the temperature of the distance keeping member is varied due to a contact with the temperature measuring portion and thereby the output of the infrared sensor is not stabilized.

SUMMARY OF THE INVENTION

An object of the present invention is to enable an accurate measurement of temperature by accurately keeping the distance between the temperature measuring portion and the infrared sensor at a predetermined value.

Another object of the present invention is to enable a simple keeping of the distance between the temperature measuring portion and the infrared sensor.

Still another object of the present invention is to enable the temperature measurement in a state of no effect by the member for keeping the distance.

Still another object of the present invention is to provide an infrared-ray temperature measuring apparatus suitable for measuring the body temperature.

Still another object of the present invention is to provide an infrared-ray temperature measuring apparatus capable of making its apparatus compact.

An apparatus in accordance with the present invention has a configuration wherein an infrared sensor is disposed inside a housing having an opening formed at a predetermined position thereof opposite to the opening, and a distance keeping member which is located out of the sight of the infrared sensor and keeps the angle made by the center of the sight of the infrared sensor and the temperature measuring portion at nearly a constant value is mounted outside the above-mentioned housing, and a temperature measuring circuit which accepts an output signal of the above-mentioned infrared sensor and outputs a signal for driving a display unit, and further a power source and a temperature measurement control switch are provided.

BRIEF DESCRIPTION OF DRAWINGS

FIG. 11(A)(B) and (C) are bottom views of contact parts showing other embodiments, respectively;

FIG. 12 is a plan view showing another embodiment of an infrared-ray temperature measuring apparatus;

FIG. 13 is a longitudinal cross-sectional view of the embodiment of FIG. 12;

FIG. 14 is a bottom view of the embodiment of FIG. 12;

DETAILED DESCRIPTION OF THE EMBODIMENTS

Figure 1:
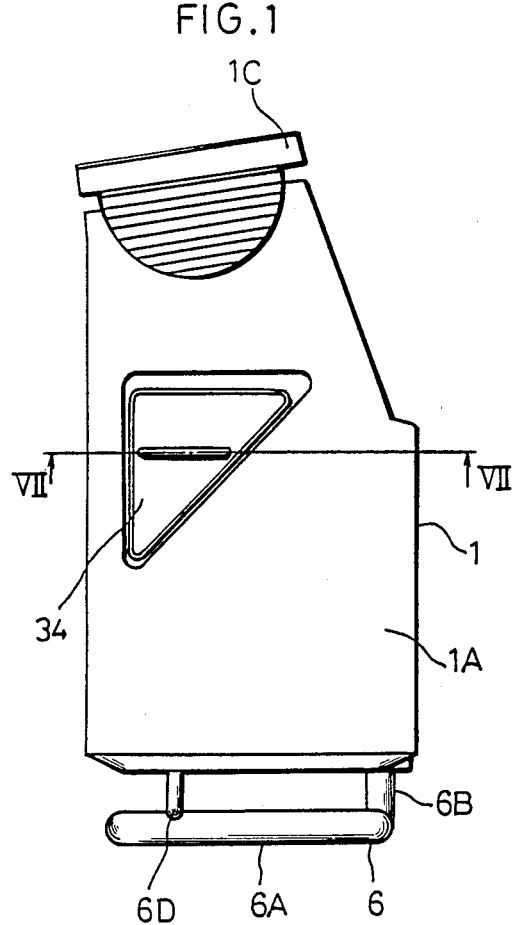
FIG. 1 is a front view showing one embodiment of an infrared-ray temperature measuring apparatus in accordance with the present invention.
Figure 2:
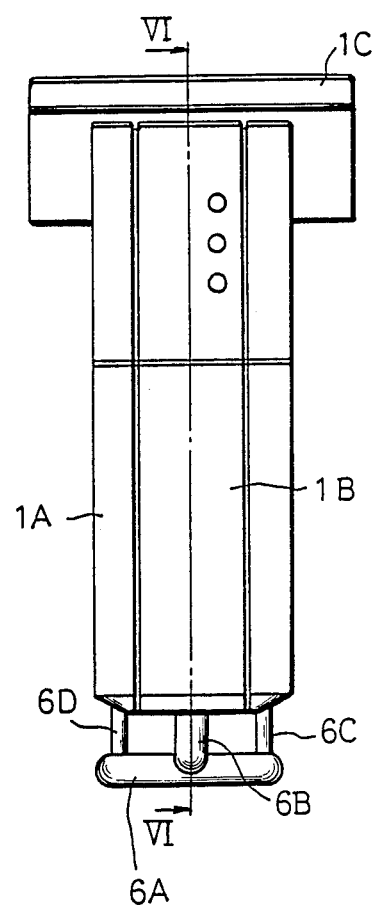
FIG. 2 is a right side view of the apparatus of FIG. 1.
Figure 3:
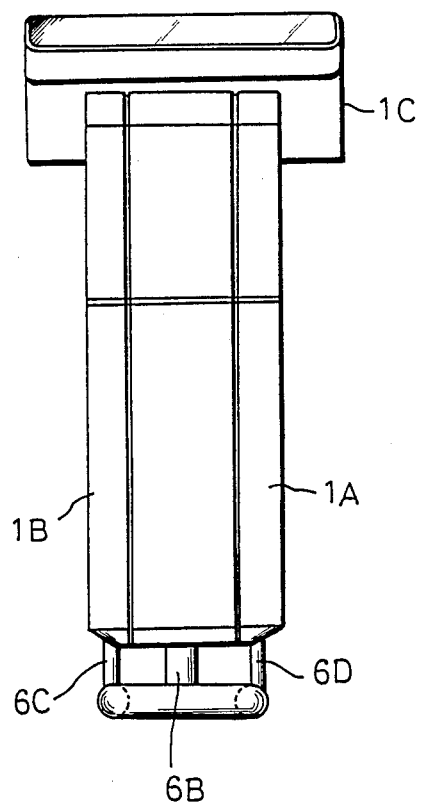
FIG. 3 is a left side view of the apparatus of FIG. 1.
Figure 4:
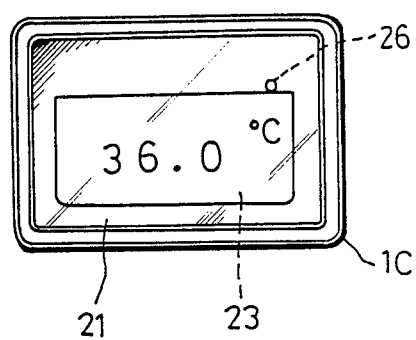
FIG. 4 is a plan view of the apparatus of FIG. 1.
Figure 5:
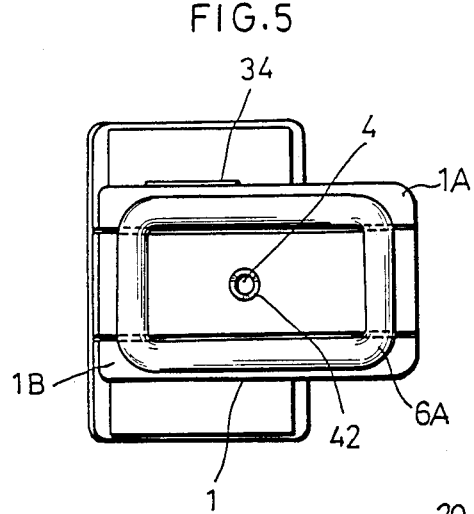
FIG. 5 is a bottom view of the apparatus of FIG. 1.

Description is made on one embodiment of an infrared-ray temperature measuring apparatus in accordance with the present invention based on FIG. 1 through FIG. 8.

A housing 1 composed of a non-transparent synthetic resin is constituted with a dish-shaped front case 1A whose back face is opened, a tray-shaped rear case 1B which closes an opening of this front case 1A and a display case 1C which is fitted to a fitting frame part 17 formed on the top end of a coupled body of these both cases 1A and 1B. In addition, the front case 1A and the rear case 1B are coupled by screws (not illustrated) in an attachable/detachable fashion, and the display case 1C is fixed by this coupling.

An opening 2 for letting infrared rays pass is formed on the bottom surface of the above-mentioned front case 1A, and an infrared sensor 3 is fixed in a sensor positioning recession 5 formed on the bottom surface of the front case 1A by means of an adhesive or the like in a state wherein a window thereof 42 as described later is opposed to the above-mentioned opening 2.

A distance keeping member 6 is for keeping the infrared sensor 3 apart from a portion whose temperature is to be measured, labeled M, such as a surface of a human body or the like, by a predetermined distance (when a temperature measurement start switch 7, as described later, is turned on), being constituted with a rectangular-ring-shaped contact part 6A contacting with the temperature measuring portion M when measuring temperature, and a first, a second and a third supporting legs 6B, 6C and 6D which stand from this contact part 6A with intervals kept from one another and are slidable through through holes 8, 9 and 10 (not shown) formed on the housing 1, respectively. Then, a rod-shaped operating part 11 having a large-diameter jaw part 11A is fixed to the tip of the first supporting leg 6B in the housing 1 by means of screws, and the top end of the operating part 11 protrudes above a supporting piece 13 which is installed so as to project in a horizontal and inward fashion from the inner surface of a side plate 12 of the front case 1A through a through hole 14 of the supporting piece 13. A coil spring 15 is provided between the above-mentioned jaw part 11A and the supporting piece 13, and normally energizes the distance keeping member 6 in the direction of separating the contact part 6A from the housing 1, and the lower limit displacement position of the distance keeping member 6 by energizing of this coil spring 15 is determined by a contact of the jaw part 11A with the inner surface of a bottom plate 16 of the front case 1A.

The temperature measurement start switch 7 composed of a microswitch forms a temperature control switch together with a temperature measurement set-up (enable) switch 33 as described later, being disposed above the tip of the above-mentioned operating part 11, and moves in the direction that the contact part 6A of the distance keeping member 6 draws near the housing 1, namely, moves upward, and thereby an operating lever 7A thereof is operated by a push of the operating part 11, and a temperature measurement start command signal is outputted. The upper limit displacement position of the distance keeping member 6 is determined by this contact of the switch 7 with the operating part 11, and the distance keeping member 6 is slidable within a range between this upper limit displacement position and the above-mentioned lower limit displacement position.

A display part 20 is disposed under a transparent plate 21 attached to the top surface opening of the display case 1C, being constituted with a first circuit board 22, a liquid crystal display unit 23 fixed to the top surface thereof, a display circuit 24 fixed to the bottom surface of the circuit board 22, and a light emitting unit 26 composed of a LED fixed to a mounting plate 25 which is attached to position and fix the circuit board 22 to the inside of the display case 1C.

A second circuit board 27 and a third circuit board 28 are mounted inside the housing 1, and electric components constituting a processing circuit 29 as described later is fixed to a front surface 27A of the above-mentioned second circuit board 27, and electric components constituting a driving circuit 30 and a temperature measurement controlling circuit 31 as described later are fixed to the right side surface of the above-mentioned third circuit board 28 (refer to FIG. 6).

The slidable temperature measurement set-up (enable) switch 33 is fixed to the back surface of the front case 1A, and a first and a second contacts 33A and 33B are turned on or off by a slide switch knob 34 attached slidably on the front surface side of the front case 1A. A recession for accommodating batteries 35 is formed in the front case in a one-piece fashion and, for example, three button type lithium batteries are inserted in a first accommodating recession 35a as a first power source 36, and, for example, five button type lithium batteries are inserted in a second accommodating recession 35B as a second power source 37. A temperature measuring circuit 38 in FIG. 8 which is constituted with the above-mentioned infrared sensor 3, switches 7 and 33, power sources 36 and 37, driving circuit 30, processing circuit 29, display circuit 24 and the like detects the temperature of the temperature measuring portion M based on detection signal from the infrared sensor 3, and the detected temperature is displayed on the display unit 23.

Hereinafter, description is made on a configuration and operation of the temperature measuring circuit 38 including the infrared sensor 3.

First, description is made on the infrared sensor 3. In reference to FIG. 9, a sensor case 40 is constituted with a metal header 41 and a cap 43 having a window 42. An infrared-ray transmitting filter 44 is fixed to the cap 43 so as to cover the above-mentioned window 42. A pyroelectric type infrared detecting body 45 is disposed in the sensor case 40 opposite to the above-mentioned window 42, and the detecting body 45 is composed of a single crystal of lithium tantalate ($LiTaO_3$) generating charges based on the quantity of change in the incidental infrared rays. A chopper mechanism 46 varies the incidental infrared rays on the above-mentioned detecting body 45, being composed of a pair of piezoelectric vibrators 47 and 48 and a pair of bodies facing each other 49 and 50 fixed to the respective ends of the vibrators 47 and 48. Then, a plurality of slits 51 of the same shape and the same size which transmit infrared rays are formed on these bodies facing each other 49 and 50, respectively.

Figure 9A:
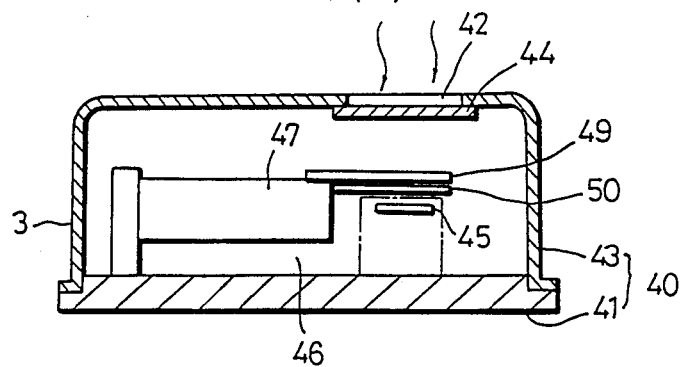
FIG. 9(A) is a cross-sectional view of an infrared sensor.
Figure 9B:
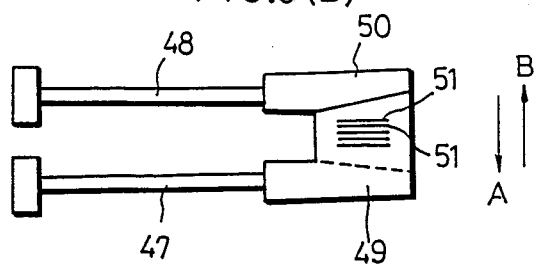
FIG. 9(B) is a plan view of the infrared sensor of FIG. 9(A)

Then, the above-mentioned vibrators 47 and 48 vibrate periodically in the directions reverse to each other (direction A or B in FIG. 9(B)), and thereby a relative positional relation of the above-mentioned bodies facing each other 49 and 50 is changed periodically, and a state wherein the respective slits 51 of the above-mentioned bodies facing each other 49 and 50 are superposed on one another to be opened and a state wherein the respective slits 51 are not superposed on one another to be closed are repeated alternately. Then, in the above-mentioned state of superposition, the infrared rays from the temperature measuring portion M go through the opening of the housing 1, pass through the infrared-ray transmitting filter 44 of the sensor case 40 and the slits 51 of the both bodies facing each other 49 and 50, and plunge into the above-mentioned infrared detecting body 45. On the other hand, in the above-mentioned non-superposed state, only the infrared rays from the bodies facing each other 49 and 50 plunge into the above-mentioned infrared detecting body 45.

Accordingly, quantity of the incidental infrared rays on the infrared detecting body 45 varies periodically, and the infrared detecting body 45 outputs a signal responding to a difference between the temperature of the above-mentioned temperature measuring portion M and the temperature of the above-mentioned bodies facing each other 49 and 50.

Figure 8:
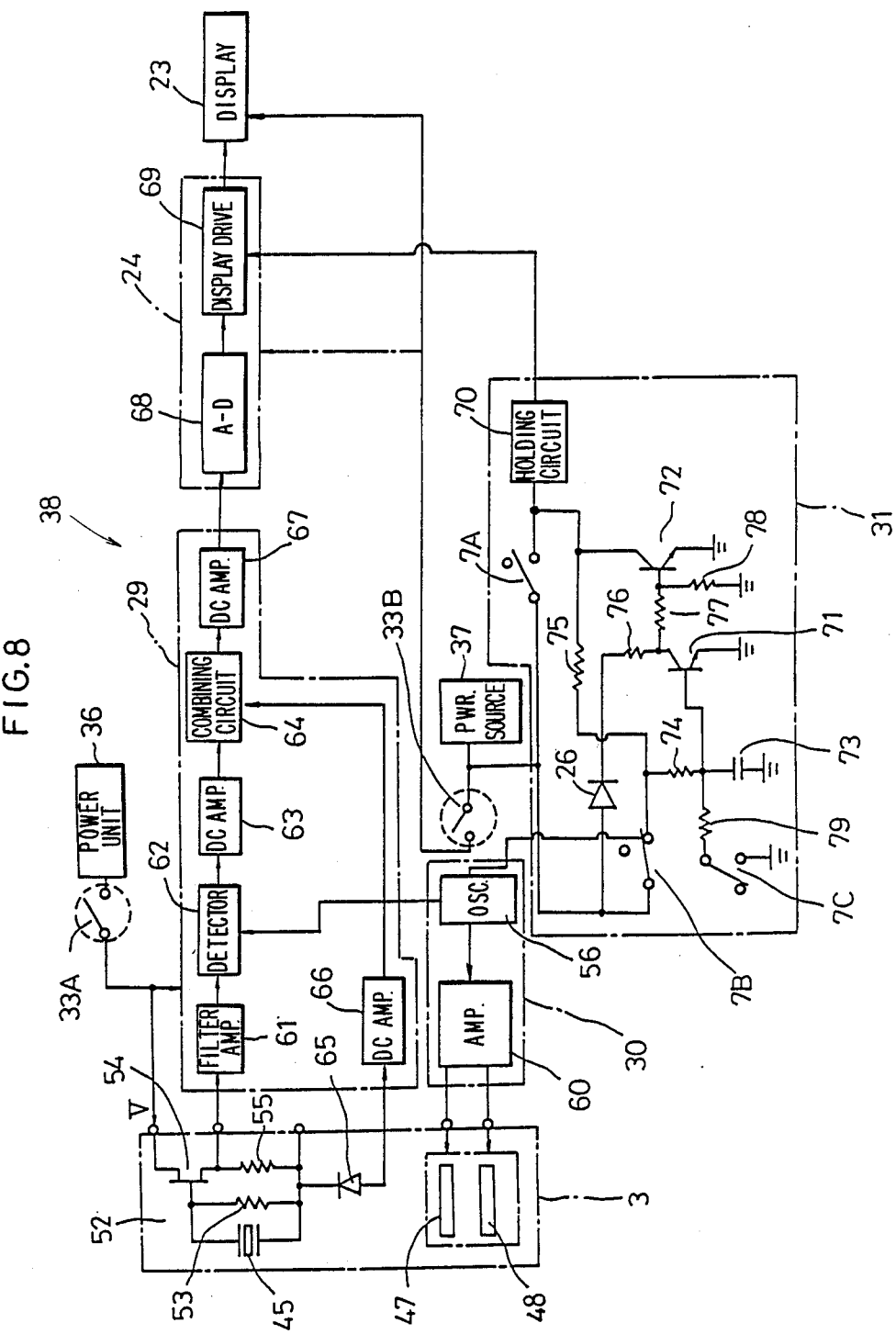
FIG. 8 is a diagram of an electric circuit suitable for incorporation into the apparatus in accordance with the present invention.

In FIG. 8, an impedance transposition circuit 52 is connected to the infrared detecting body 45, being constituted with a high input resistor 53 of $10^{10}$–$10^{11}\Omega$, a FET 54 and a high output resistor 55 of about $10K\Omega$. Then, a signal responding to a difference between the temperature of the temperature measuring portion M and the temperature of the above-mentioned bodies facing each other 49 and 50 is outputted from the source of the above-mentioned FET 54, and a DC voltage V is applied to the drain from the first power source 36 through the first temperature measurement set-up (enable) contact 33A.

Figure 10:
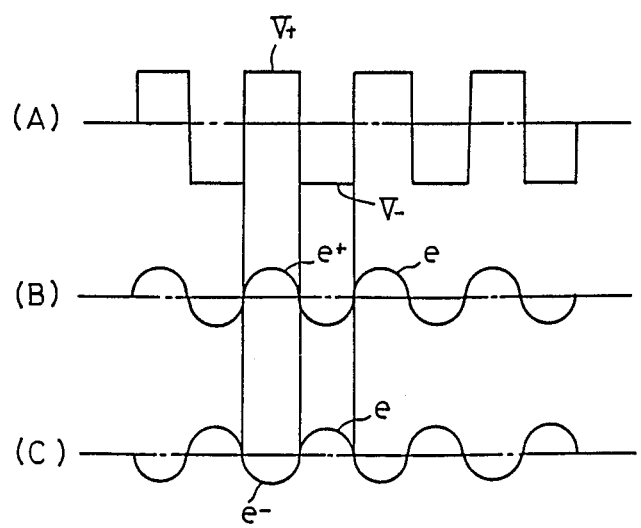
FIG. 10 is a characteristic graph.

Next, the driving circuit 30 is constituted with an oscillator 56 which generates a pulse-shaped voltage as shown in FIG. 10(A) and an amplifier 60 which amplifies the above-mentioned pulse-shaped voltage and applies it to the above-mentioned vibrators 47 and 48. Accordingly, a signal responding to the above-mentioned temperature difference is outputted from the sensor 3 by the vibrations of the above-mentioned vibrators 47 and 48 in the directions of A and B as described above. Such a signal is actually an AC signal e as shown in FIG. 10(B) or (C), and the amplitude thereof responds to the above-mentioned temperature difference. Next, description is made on the processing circuit 29.

The above-mentioned AC signal e is inputted to a detector 62 through a filter amplifier 61, and the detector 62 synchronizes the above-mentioned AC signal e with the output of the above-mentioned oscillator 56, and when the temperature of the temperature measuring portion M is higher than the temperature of the bodies facing each other 49 and 50, the detector 62 detects and outputs a positive DC signal responding to the temperature difference between them, and when the temperature of the temperature measuring portion M is lower than the temperature of the bodies facing each other 49 and 50, it detects and outputs a negative DC signal responding to the temperature difference between them. That is, as to the above-mentioned AC signal e, if the temperature of the temperature measuring portion M is higher than the temperature of the bodies facing each other 49 and 50, a positive side half cycle e+ agrees with the positive side half cycle V+ of the output of the oscillator 56 as shown in FIG. 10(B), and if the temperature of the temperature measuring portion M is lower than the temperature of the bodies facing each other 49 and 50, a negative half cycle e− agrees with a positive half cycle V+ of the output of the oscillator 56 as shown in FIG. 10(C). Then, if an agreement in the former case is achieved, a positive DC signal responding to a difference between the temperature of the temperature measuring portion M and the temperature of the bodies facing each other 40 and 50 is outputted from the above-mentioned detector 62, and if an agreement in the latter case is achieved, a negative DC signal responding to such temperature difference is outputted. An output from the above-mentioned detector 62 is inputted to a combining circuit 64 through a DC amplifier 63. Also, an output from a temperature measuring diode 65 installed in the above-mentioned sensor 3 is inputted to the above-mentioned combining circuit 64 through a DC amplifier 66. In addition, an output of this diode 65 is a signal responding to the temperature of the bodies facing each other 49 and 50. Then, the above-mentioned combining circuit 64 adds up these two inputs, and outputs a signal responding to the actual temperature of the temperature measuring portion M, and this signal is amplified by a DC amplifier 67.

Next, description is made on the displaying circuit 24.

The signal which is outputted from the above-mentioned combing circuit 64 and is amplified by the DC amplifier 67 is inputted to an A-D converter 68, and is converted into a digital signal by such a converter 68, being outputted. Then, the above-mentioned digital signal is inputted to a display driving circuit 69, and this circuit 69 displays the measured temperature on the above-mentioned display unit 23 based on the above-mentioned digital signal.

Finally, description is made on the temperature measurement controlling circuit 31.

A first normally-closed contact 7A, a second normally-opened contact 7B and a third normally-closed contact 7C constituting the temperature measurement start switch 7 are put in an opened or closed state as shown in FIG. 8 when the temperature measurement start switch 7 is pushed by the distance keeping member 6. One end of the above-mentioned first contact 7A is connected to the second power source 37, and the other end thereof is connected to the display driving circuit 69 through a holding circuit 70. The holding circuit 70 outputs a hold signal to the display driving circuit 69 by energizing, fixing the display of the display unit 23. The above-mentioned second contact 7B is installed between the second power source 37 and the oscillator 56. Also, a first and a second transistors 71 and 72, a capacitor 73 and a first-a fifth resistors 74–78 each of which for controlling the light emitting unit 26 are provided, and the above-mentioned third contact 7C is connected in parallel with the capacitor 73 through a sixth resistor 79. In addition, the time constant is determined so that the period of time from start of charging the capacitor 73 to rise of charged potential to a potential which turns on the transistor 71 is about 5 seconds.

The above-mentioned second power source 37 is connected to the displaying circuit 24 and the display unit 23 through the second contact 33B, supplying the displaying circuit 24 and the display unit 23 with power.

Description is made on operation of the embodiment constituted as mentioned above.

In a state before the temperature is measured, the contacts 33A and 33B of the set-up (enable) switch 33 are turned off, and no temperature measuring operation is performed.

Next, when the set-up (enable) switch is turned on, the processing circuit 29, the displaying circuit 24 and the display unit 23 are supplied with power, and the display unit 23 performs a display, but this display does not change because the holding circuit 70 is operated by a make (ON) of the first contact 7A. Then, the preparatory operation is completed about one minute after a make (ON) of the switch 33.

Figure 6:
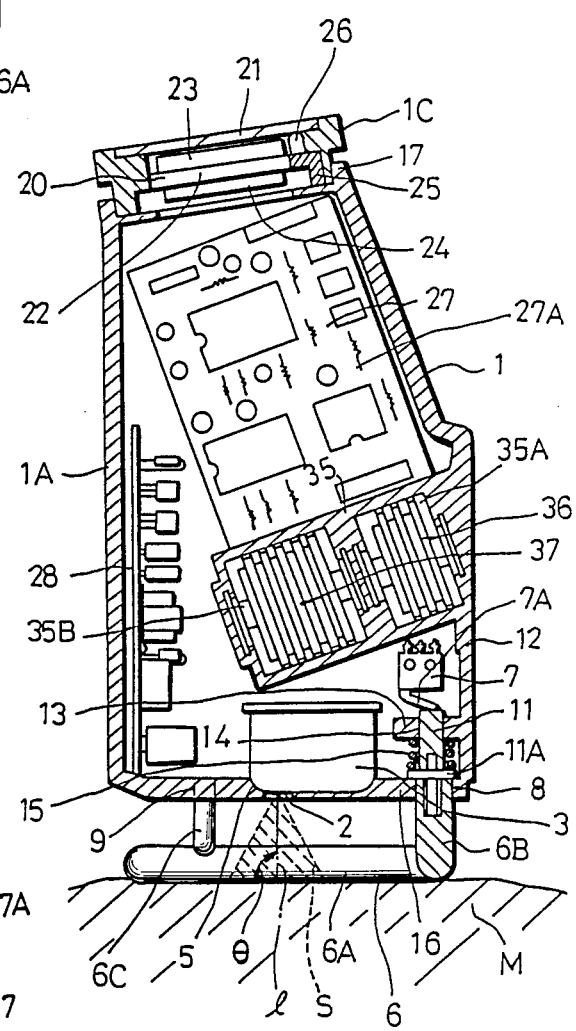
FIG. 6 is a cross-sectional view taken along line VI-VI in FIG. 2.
Figure 7:
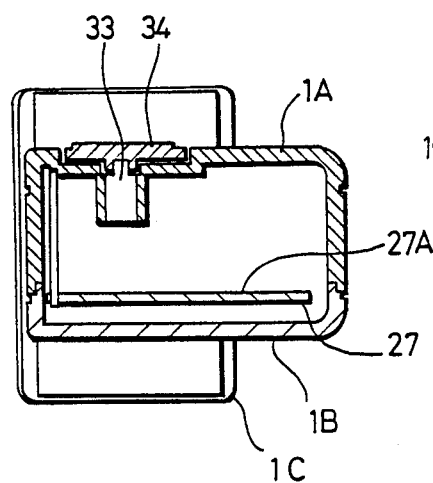
FIG. 7 is a cross-sectional view taken along line VII-VII in FIG. 1.

Then, the contact part 6A of the distance keeping member 6 is brought in contact with the temperature measuring portion as M as shown in FIG. 6, and further the housing 1 is pushed in toward the temperature measuring portion M, and thereby the temperature measurement start switch 7 is switched over to an opened or closed state as illustrated in FIG. 8. Then, the driving circuit 30 is supplied with power through the second contact 7B, and also a hold by the holding circuit 70 is released by a break (OFF) of the first contact 7A, and the temperature measurement is started. Then, the measured values of temperatures are displayed in sequence on the display unit 23, and a display is stabilized in about 4-5 seconds, and the temperature measurement is completed. At the same time, the transistor 71 is turned on by charging of the capacitor 73, and thereby the light emitting unit 26 is lit to inform of the end of temperature measuring, and also a transistor 72 is put in OFF state, and the holding circuit 70 is energized to hold intact the measured value of temperature displayed on the display unit 23.

When the housing 1 is parted from the temperature measuring portion M based on this information, the start switch 7 is reversed to be restored, and energizes the holding circuit 70 to hold the measured value of temperature displayed on the display unit 23. Also, the charge of the capacitor 73 is discharged by a make (ON) of the third contact 7C.

In addition, the temperature measured in such a manner is the body surface temperature lower than the body temperature measured in the mouth of the like when the temperature measuring portion M is of the human body, and therefore a converting circuit (not illustrated) which converts the body surface temperature into the true temperature based on the data obtained in advance by experiments is desirably contained in the displaying circuit 24.

In the above-described temperature measuring operation, the contact part 6A of the distance keeping member 6 is of a ring shape, and therefore, the angle $\theta$ made by the center (l) of the sight (S) of the infrared sensor 3 and the temperature measuring portion M can be kept at nearly a constant value (about 90° in the embodiment) when the apparatus contacts with the temperature measuring portion M, and thereby a change in the output of the sensor 3 due to a change in the above-mentioned angle $\theta$ can be prevented. Also, when measuring the temperature (when the temperature measurement start switch 7 is operated), the distance between the temperature measuring portion M and the infrared sensor 3 can be kept constant, and thereby a change in the output of the infrared sensor 3 due to a change in this distance can be prevented. Furthermore, since the reaction of the pressure for operating the temperature measurement start switch 7 is dispersed at the above-mentioned contact part 6A, this reaction is never applied locally to the temperature measuring portion M.

In addition, the shape of the contact part 6A of the distance keeping member 6 is not limited to the one in the above-mentioned embodiment, but such shapes that part of the right is opened as shown in FIG. 11(A), (B) and (C) may be adopted. Particularly, in the case of FIG. 11C, the contact parts 6A and 6A are coupled by the portion not in contact with the portion M whose temperature is to be measured. Also, the distance keeping member 6 may be constituted with a cylindrical body (not illustrated) other than the wire material.

Also, the temperature measurement set-up (enable) switch 33 may be operated simultaneously with start of the temperature measurement start switch 7.

Furthermore, the infrared sensor 3 is not limited to of pyroelectric type, but may be kept of thermistor type. In short, it has only to be the one which receives infrared rays and outputs a voltage responding to the quantity of received infrared rays and the quantity of change in received infrared rays. Then, in the case of the thermistor type, the incidental infrared rays are not required to be chopped, but chopping is preferable because it can improve the S/N ratio.

In accordance with the infrared-ray temperature measuring apparatus constituted as mentioned above, the distance between the infrared sensor and the temperature measuring portion is kept constant when measuring the temperature, and the angle made by the center of the sight of this sensor and the temperature measuring portion always can be kept nearly constant, and also the distance keeping member is out of the sight of the infrared sensor, and therefore an accurate temperature measurement can be carried out. Also, the portion which contacts with the temperature measuring portion to operate the temperature measurement start switch of the distance keeping member is of a ring shape or a partly-opened ring shape, and therefore the pressure is not applied locally to the temperature measuring portion in this operation, and when the temperature measuring portion is the surface of the human body, no person whose temperature is to be measured feels uncomfortable. Also, the temperature measurement start switch can be operated by pushing the housing into the temperature measuring portion, and therefore this apparatus excels in the operationability.

Description is made on another embodiment of the infrared-ray temperature measuring apparatus in accordance with the present invention based on FIG. 12 through FIG. 17.

In the figures, a housing 101 is composed of a non-transparent material, and is formed in nearly a cylindrical shape, one end of which forms an opening 102, and a neck part 103 is provided at the opening 102 side. The neck part 103 corresponds to the opening 2 described in the embodiment of FIGS. 1 to 8, and a tip part K beyond the neck part 103 to the opening 102 side corresponds to the member 6 of the same embodiment from FIGS. 1 to 8. Also, the end of the above-mentioned opening 102 is covered with a contact material 108 composed of an elastic material such as rubber or the like. The infrared sensor 104 is disposed in the housing 101 and above the above-mentioned neck part 103 with a predetermined distance kept apart from the opening 102. Then, a window 113 of this sensor 104 as described later faces the opening 102 of the above-mentioned housing 101. A display part 105 is composed, for example, of a liquid crystal displaying apparatus, being attached to the other end of the above-mentioned housing 101. A circuit board 106 is disposed between the infrared sensor 104 and the displaying part 105 in the above-mentioned housing 101, and detects the temperature of the temperature measuring portion M based on a detection signal from the above-mentioned infrared sensor 104, and also circuit components required for displaying the detected temperature on the displaying part 105 are attached. A switch 107 is a temperature measurement control switch which executes the functions of both of the temperature measurement set-up (enable) switch 33 and the temperature measurement start switch 7 in the above-mentioned first embodiment.

The operation of the infrared sensor 104 for detecting the temperature of the temperature measuring portion M can be explained just in the same manner as that described referring to FIG. 9(A) and FIG. 9(B).

Figure 15:
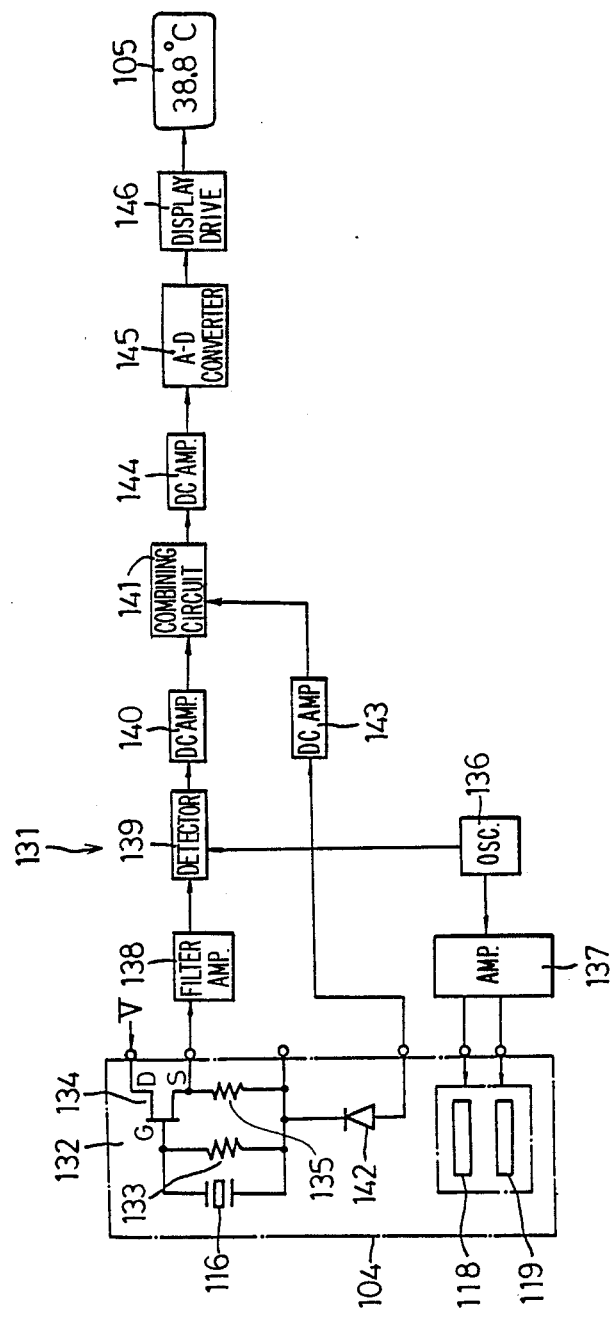
FIG. 15 is an electric circuit diagram suitable for incorporation into the apparatus of FIG. 12.

FIG. 15 shows a circuit 131 for measuring the temperature of the temperature measuring portion M including the above-mentioned sensor 104. In addition, parts other than the sensor 104 are attached to the above-mentioned circuit board 106. In the figure, an impedance transposition circuit 132 is connected to the infrared detecting body 116, and this transposition circuit is constituted with a high input resistor 133 of $10^{10}$–$10^{11}\Omega$, a FET 134, and an output resistor 135 of 10K$\Omega$. Then, a signal responding to a difference between the temperature of the portion whose temperature is to be measured M and the temperature of the above-mentioned bodies facing each other 120 and 121 (not illustrated), which are the same bodies as 49 and 50 in FIG. 9, is outputted from the source of the above-mentioned FET 134, and a DC voltage V is applied to the drain thereof.

Figure 16:
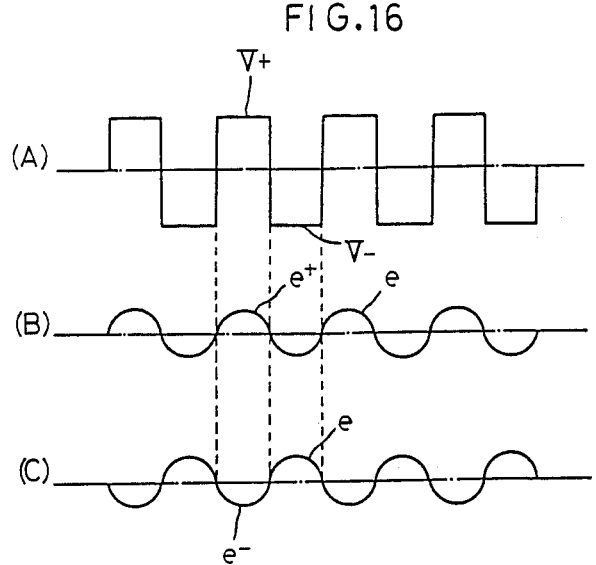
FIG. 16(A) (B) and (C) are wave-form graphs useful for understanding the apparatus of FIG. 12.

An oscillator 136 generates a pulse-shaped voltage as shown in FIG. 16A, and the above-mentioned pulse-shaped voltage is amplified by an amplifier 137, being applied to the vibrators 118 and 119, which are the same vibrators as those of references 47 and 48 as mentioned in the description referring to FIG. 8. Accordingly, the signal responding to the above-mentioned temperature difference is outputted from the sensor 104 by the above-described vibrations in the directions A and B of the above-mentioned vibrators 118 and 119. Such a signal is actually an AC e as shown in FIG. 16 (B) or (C), and the amplitude thereof responds to the above-mentioned temperature difference.

The above-mentioned AC signal e is inputted to a detector 139 through a filter amplifier 138, and the detector 139 synchronizes the above-mentioned AC signal e with the output of the above oscillator 136, and when the temperature of the temperature measuring portion M is higher than the temperature of the bodies facing each other 120 and 121, the detector 138 detects and outputs a positive DC signal, and when the temperature of the temperature measuring portion M is lower than the temperature of the bodies facing each other 120 and 121, it detects and outputs a negative DC signal responding to a difference between them. That is, as to the above-mentioned AC signal e, if the temperature of the temperature measuring portion M is higher than the temperature of the bodies facing each other 120 and 121, a positive side half cycle e+ agrees with a positive side half cycle V+ of output of the oscillator 136 as shown in FIG. 16(B), and if the temperature of the temperature measuring portion M is lower than the temperature of the bodies facing each other 120 and 121, a negative side half cycle e− agrees with a positive side half cycle V+ of output of the oscillator 136 as shown in FIG. 16(C). Then, when an agreement in the former case is achieved, a positive DC signal responding to a difference between the temperature of the temperature measuring portion M and the bodies facing each other 120 and 121 is outputted from the above-mentioned detector 139, and when an agreement in the latter case is achieved, a negative signal responding to such a temperature difference is outputted. An output from the above-mentioned detector 139 is inputted to a combining circuit 141 through a DC amplifier 140. Also, an output from a temperature measuring diode 142 installed in the above-mentioned sensor 104 is inputted to the above-mentioned combining circuit 141 through a DC amplifier 143. In addition, the output from this diode 142 is a signal responding to the temperature of the bodies facing each other 120 and 121. Then, the above-mentioned combining circuit 141 adds these two inputs and outputs a signal responding to the actual temperature of the temperature measuring portion M, and this signal is amplified by a DC amplifier 144, thereafter being converted into a digital signal by an A-D converter 145. Then, the above-mentioned digital signal is inputted to a display driving circuit 146, and this circuit 146 displays the measured temperature on the above-mentioned digital signal.

Figure 17:
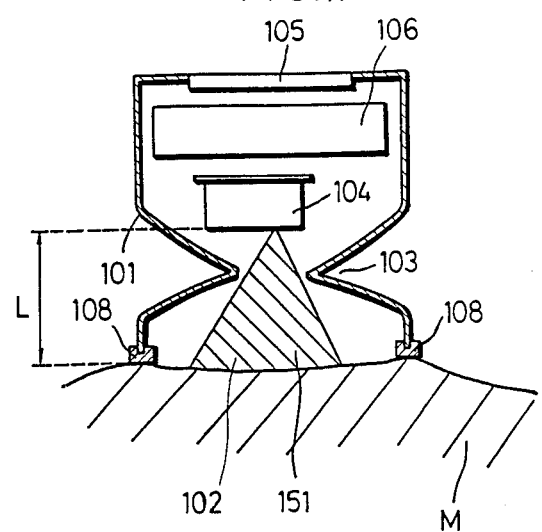
FIG. 17 is a view for explaining a state of temperature measurement.

Then, in conducting the temperature measurement employing the infrared-ray temperature measuring apparatus of the above-mentioned embodiment, first the end of the opening 102 of the housing 101 is brought in contact with the temperature measuring portion M as shown in FIG. 17. Thereby, the infrared sensor 104 and the temperature measuring portion M can be disposed with a predetermined distance L kept apart from each other.

Thereafter, simultaneously with starting pressing of the above-mentioned start switch 107, the temperature measuring circuit 131 is operated, and an accurate temperature of the above-mentioned temperature measuring portion M is measured, and also the result of measurement is displayed on the display part 105. In addition, by releasing the pressing of the above-mentioned start switch 107, the temperature measurement is completed.

Also, a detecting range 151 of the infrared sensor 104 is desirably set so that the above-mentioned housing 101 will not come to contact with the detecting range 151. This is because, in a state wherein the housing 101 is in contact with the temperature measuring portion M, the housing 101 is heated by the heat conduction from the temperature measuring portion M, and thereby no accurate temperature of the portion whose temperature is to be measured M can be measured.

Figure 18:
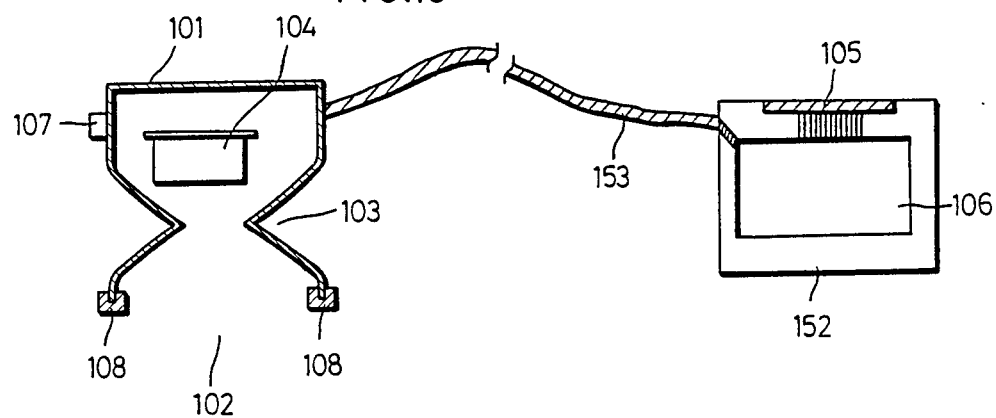
FIG. 18 is a schematic diagram showing another embodiment.

FIG. 18 shows another embodiment in accordance with the present invention.

In the embodiment of FIG. 12 to 17, the infrared sensor 104, the display part 105, the circuit board 106 and the like are accommodated in one housing 101, but such a configuration has such problems that the outer size of the housing 101 becomes large, and also the whole weight of the appartus becomes heavy, and therefore it is difficult to put the apparatus in contact with the portion whose temperature is to be measured M during the measurement, and also it is difficult to measure the temperature of a narrow or small part of the temperature measuring portion M. As shown in FIG. 18, only the infrared sensor 104 is accommodated in the housing 101, and the display part 105 and the circuit board 106 are accommodated in another housing 152, and the above-mentioned sensor 104 is connected to the circuit board 106 through a flexible conductive wire 153. Such a configuration, enables the apparatus to become smaller and lighter because only the infrared sensor 104 is accommodated in the housing 101, and accordingly facilitates the contact with the temperature measuring portion M and the measurement of the temperature of the temperature measuring portion M. Also, since the temperature measuring portion M is surrounded completely by the housing 101, a change in temperature of the temperature measuring portion M due to a wind disturbance or the like is prevented and thereby an accurate temperature measurement (measurement of true body temperature if the temperature measuring portion M is the human body) can be conducted.

Figure 19:
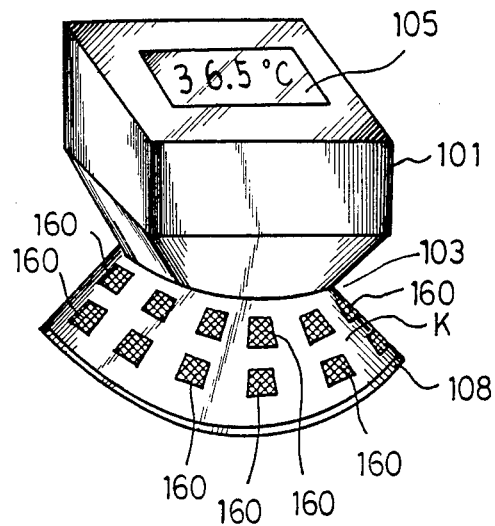
FIG. 19 and FIG. 20 are perspective views showing other embodiments.

FIG. 19 is a perspective view showing still another embodiment, which differs from the above-mentioned embodiment in FIG. 12 only in that a large number of through holes 160 are formed at the tip part beyond the neck part 103 of the housing 101, and each hole 160 is formed in a mesh shape to provide the gas permeability.

Accordingly, in the case of this embodiment, a change in the temperature of the temperature measuring portion M due to a wind disturbance or the like can take place, but the temperature about five seconds after is to be measured by adopting the above-mentioned embodiment, and therefore it seems that any trouble does not occur particularly.

In addition, setting of the hole (aperture) coefficient of the through holes 160, which is defined below, to 50-80% stabilizes quickly the temperature and also reduces the change in temperature due to a wind disturbance.

Hole (Aperture) coefficient=(Total area of holes)/
(Area of tip part K)×100

Figure 20:
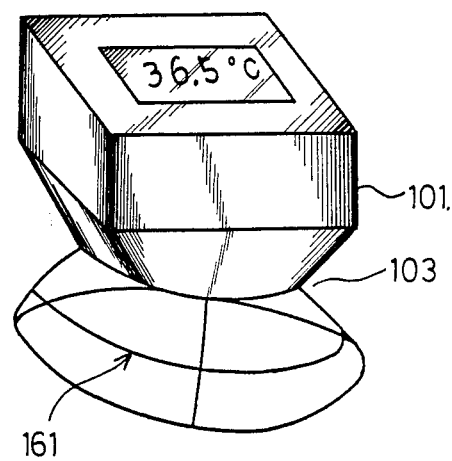

FIG. 20 is a perspective view showing still another embodiment, which differs from the above-mentioned embodiment in FIG. 19 only in that a tip part K beyond the neck part 103 is a frame-shaped part 161 constituted with wire-shaped bodies consisting of a pipe or the like.

Accordingly, also in the case of this embodiment, the gas permeability can be provided likewise the case of the embodiment in FIG. 19.

Figure 21:
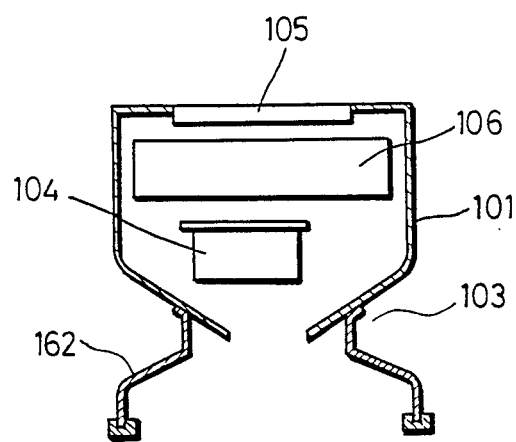
FIG. 21 through FIG. 23 are longitudinal cross-sectional views showing other embodiments, respectively.

In addition, in the above-mentioned embodiments in FIG. 19 and FIG. 20, a configuration as shown in FIG. 21 can be adopted for the structure of mounting the tip part beyond the neck part 103, that is, a structure can be adopted wherein the tip part of the housing 101 is throttled so as to have an opening of narrow width and another member 162 is mounted at a predetermined surface position of this throttled part.

Figure 22:
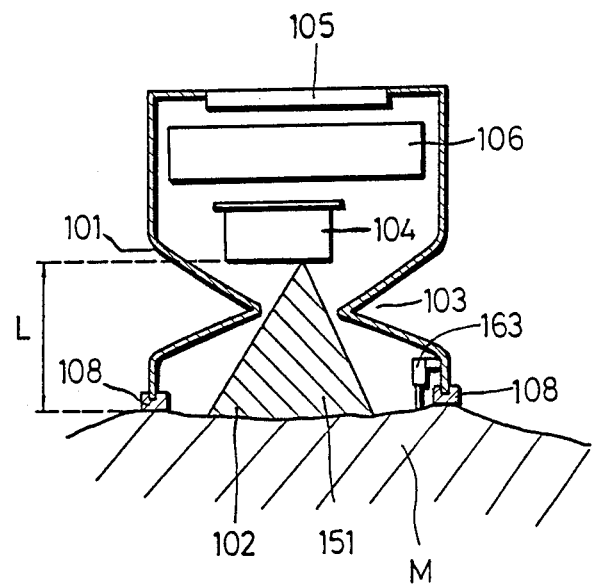

FIG. 22 is a longitudinal cross-sectional view showing still another embodiment, which differs from the above-mentioned embodiment in FIG. 12 only in that a microswitch 163 for controlling measuring temperature is mounted inside the opening 102 of the housing 101.

Accordingly, by bringing the opening 102 side in contact with the temperature measuring portion M, the microswitch 163 is operated automatically to start the temperature measurement, and in reverse, by parting them from each other, the temperature measurement can be stopped automatically.

Figure 23:
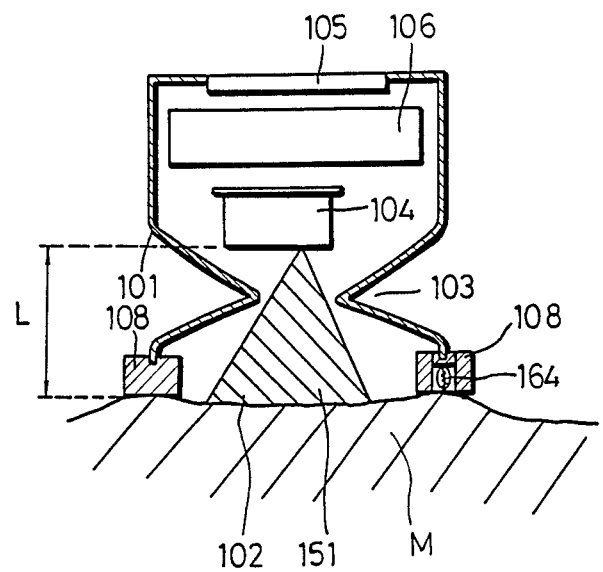

FIG. 23 is a longitudinal cross-sectional view showing still another embodiment, which differs from the above-mentioned embodiment in FIG. 22 only in that a thermosensitive switch 164 composed of a thermistor or the like is mounted at a predetermined position inside the contact material 108 covering the end of the opening 102 of the housing 101.

Accordingly, only in the case where the apparatus contacts with the portion whose temperature is to be measured M having a temperature higher than a temperature at which the thermosensitive switch 164 operates, the temperature measurement is started automatically, and in other cases, no temperature measurement is conducted. That is, when the above-mentioned operating temperature is set, for example, to 35° C., the temperature measurement is started automatically by bringing the apparatus in contact with the human body whose temperature is always higher than 35° C., and in the case where the apparatus is left on a desk or the like whose temperature is normally lower than 35° C., no temperature measurement is conducted.

In addition, the switch 163 and the switch 164 of the embodiments in FIG. 22 and FIG. 23 may be switches which execute the functions of both of the temperature measurement set-up (enable) switch 33 and the temperature measurement start switch 7, or may be switches which execute only the function of the switch 7. In the latter case, another switch equivalent to the switch 33 is installed.

Figure 24:
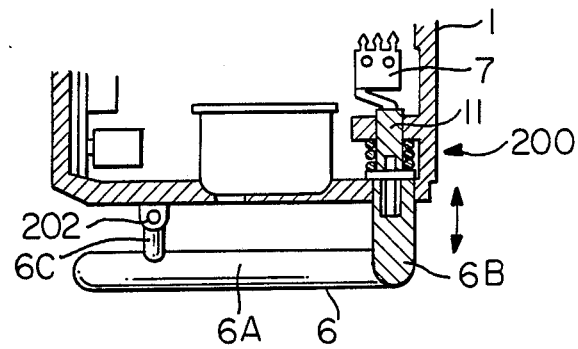
FIG. 24 is a cross-sectional view of still another embodiment of a temperature measuring apparatus according to the present invention.
Figure 25:
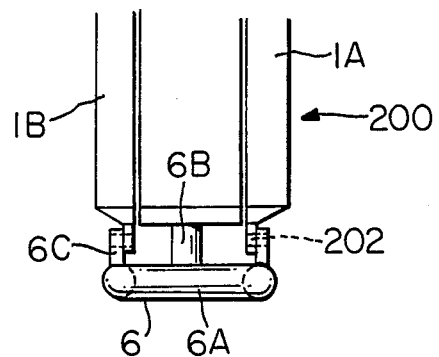
FIG. 25 is a side view of the embodiment of FIG. 24.

Still another embodiment of a temperature measuring apparatus 200 according to the present invention is shown in FIG. 24 and 25. In apparatus 200, the side having the operating part 11 is slidable. Start switch 7 is operated by distance keeping member 6. Distance keeping member 6 is rotatable with respect to housing 1 and is thus provided with fulcrum means 202 on the side opposite to operating part 11.

What is claimed is:

1. An infrared-ray temperature measuring apparatus for measuring the temperature of a portion of an object, said apparatus comprising:
   a housing,
   an infrared sensor adapted to provide an output signal in response to infrared radiation detected by said sensor,
   a distance keeping member,
   a temperature measuring circuit,
   temperature measurement control switch means for controlling the initiation of a temperature measurement,
   a display unit, and
   a power source,
   said housing having an opening formed at one end thereof,
   said infrared sensor being disposed in said housing opposite to said opening,
   said distance keeping member being located out of sight of said infrared sensor and maintaining said infrared sensor a predetermined distance away from the portion the temperature of which is to be measured, said distance keeping member having an element adapted to maintain an angle defined by the center of the line of sight of said infrared sensor and the portion the temperature of which is to be measured at nearly a constant value, said temperature measuring circuit responsive to the output signal from said infrared sensor for providing an output signal representing the temperature of the portion, said temperature measurement control switch means including a temperature measurement initiation switch for initiating temperature measurement when said distance keeping member contacts the portion to be measured, said display unit receiving the output signal from said temperature measuring circuit to display the temperature of the portion.

2. An infrared-ray temperature measuring apparatus in accordance with claim 1, wherein said distance keeping member element is formed in a ring shape.

3. An infrared-ray temperature measuring apparatus in accordance with claim 1, wherein said distance keeping member element is formed in a partially-cut-ring shape.

4. An infrared-ray temperature measuring apparatus in accordance with claim 1, wherein said temperature measuring circuit, said temperature measurement control switch, said display unit and said power source are provided in said housing.

5. An infrared-ray temperature measuring apparatus in accordance with claim 1, wherein said temperature measurement initiation switch enables temperature measurement.

6. An infrared-ray temperature measuring apparatus for measuring the temperature of a portion of an object, said apparatus comprising:

a housing having an opening formed at one end thereof;

an infrared sensor disposed in said housing opposite to the opening and adapted to provide an output signal in response to infrared radiation detected by said sensor;

a distance keeping member located out of sight of said infrared sensor and maintaining said infrared sensor a predetermined distance away from the portion the temperature of which is to be measured, said distance keeping member having an element adapted to maintain an angle, defined by the center of the line of sight of said infrared sensor and the portion the temperature of which is to be measured, at nearly a constant value;

a temperature measuring circuit, responsive to the output signal from said infrared sensor for providing an output signal representing the temperature of the portion;

a temperature measurement control switch for controlling the initiation of a temperature measurement, said temperature control switch including a temperature measurement enable switch and a temperature measurement initiation switch; and a display unit responsive to the output signal from said temperature measuring circuit for displaying the temperature of the portion.

7. An infrared-ray temperature measuring apparatus in accordance with claim 1 or 6, wherein said distance keeping member covers said opening and the portion to be measured in a tightly closed fashion.

8. An infrared-ray temperature measuring apparatus in accordance with claim 7, wherein said distance keeping member has a cylindrical body.

9. An infrared-ray temperature measuring apparatus in accordance with claim 1 or 6, wherein said temperature measurement initiation switch is located in said distance keeping member element.

10. An infrared-ray temperature measuring apparatus in accordance with claim 1 or 6, wherein said distance keeping member is slidable against said housing and said temperature measurement intitiation switch is operated by said distance keeping member.

11. An infrared-ray temperature measuring apparatus in accordance with claim 1 or 6, wherein said distance keeping member is rotatable against said housing and said temperature measurement initiation switch is operated by said distance keeping member.

12. An infrared-ray temperature measuring apparatus in accordance with claim 1 or 6, wherein said distance keeping member covers said opening and the portion to be measured in a non-closed fashion to provide a view of the portion to be measured.

13. An infrared-ray temperature measuring apparatus in accordance with claim 12, wherein said distance keeping member is formed of a wire material.

14. An infrared-ray temperature measuring apparatus in accordance with claim 12, wherein said distance keeping member comprises a cylindrical body with a vent formed at a predetermined position in said cylindrical body.

15. An infrared-ray temperature measuring apparatus in accordance with claim 1 or 6, wherein said temperature measurement initiation switch includes means on said distance keeping member and responsive to being pressed against the portion for initiating temperature measurement.

16. An infrared-ray temperature measuring apparatus in accordance with claim 1 or 6, wherein said temperature measurement initiation switch includes means on said distance keeping member and responsive to detection of a temperature difference between the portion to be measured and the distance keeping member when said initiation switch contacts the portion for initiating temperature measurement.

* * * * *